(12) United States Patent
Compton et al.

(10) Patent No.: US 7,865,783 B2
(45) Date of Patent: Jan. 4, 2011

(54) AUTOMATED MICROCODE DETECTED ERROR INDEX GENERATION

(75) Inventors: Matthew Charles Compton, Tucson, AZ (US); Louis Daniel Echevarria, Tucson, AZ (US); Ricardo Sedillos Padilla, Tucson, AZ (US); Richard Albert Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 12/125,799

(22) Filed: May 22, 2008

(65) Prior Publication Data
US 2009/0292955 A1  Nov. 26, 2009

(51) Int. Cl.
*G06F 11/00* (2006.01)
(52) U.S. Cl. .......................................... 714/49; 714/48
(58) Field of Classification Search ............. 714/49, 714/48, 52, 57, 47, 25
See application file for complete search history.

(56) References Cited

U.S. PATENT DOCUMENTS

| 4,999,837 | A | * | 3/1991 | Reynolds et al. ............ 714/703 |
| 5,187,785 | A | | 2/1993 | Shah |
| 5,659,801 | A | * | 8/1997 | Kopsaftis ..................... 710/62 |
| 6,192,365 | B1 | | 2/2001 | Draper et al. |
| 7,562,263 | B1 | * | 7/2009 | Engelbrecht et al. .......... 714/49 |
| 2005/0138489 | A1 | * | 6/2005 | Benhase et al. ............... 714/56 |
| 2007/0050679 | A1 | | 3/2007 | Reddy |
| 2007/0168991 | A1 | | 7/2007 | Greenberg et al. |
| 2008/0276017 | A1 | * | 11/2008 | Benhase et al. ............... 710/36 |
| 2009/0172368 | A1 | * | 7/2009 | Havin et al. .................. 712/227 |

* cited by examiner

*Primary Examiner*—Dieu-Minh Le
(74) *Attorney, Agent, or Firm*—Griffiths & Seaton PLLC

(57) ABSTRACT

A method, system and computer program product for logging and identifying microcode errors in a computing environment is provided. Each of a plurality of errors in the microcode is logged using a plurality of error logging commands. Each of the plurality of errors is indexed to generate a plurality of indexed errors. A plurality of unique keys is associated to each of the plurality of indexed errors. A master index of the plurality of unique keys is created.

18 Claims, 3 Drawing Sheets

AUTOMATED MICROCODE DETECTED ERROR INDEX GENERATION

BACKGROUND OF THE INVENTION

1. Field of the Invention

The present invention relates in general to computers, and more particularly to a method, system, and computer program product for logging and identifying microcode errors in a computing environment.

2. Description of the Related Art

Computers, and accompanying computer processing in various implementations, are commonplace in today's society. Processing hardware, such as central processing units (CPUs) are found in a variety of settings. Microprogramming (i.e., writing microcode) is a method that may be employed to implement machine instructions for hardware such as a CPU relatively easily, often using less hardware than with other methods. Microcode provides a set of detailed and rudimentary lower-level routines that control and sequence the actions needed to execute particular instructions. In addition, the microcode may also control and sequence actions needed to decode the instructions.

CPU microcode is normally written by the CPU engineer during the design phase. It is generally not meant to be visible or changeable by a normal programmer, one of the reasons being that microcode (by design) can be dramatically changed with a new microarchitecture generation. Machine code often retains backwards compatibility. Microcode has often been used to let one microarchitecture emulate another, usually more powerful, architecture. In some cases, use of the term "microcode" may refer more generically to firmware closely associated with the control of other hardware devices, such as hard disk drives (HDDs).

In the development of microcode, developers across many code components typically use a common function to log errors. When a failure occurs, these Microcode Detected Errors (MDE) are intended to provide service people with an indication of what code component failed. In some computing environments, however, the number of registered errors in the common logging utility has not grown with the increase in code components. As a result, there is wide spread duplication in errors being logged by different components. In short, the error identifiers for an MDE no longer uniquely identify a code component, much less a particular position in microcode.

SUMMARY OF THE INVENTION

In light of the foregoing, a need exists for a mechanism by which developers can log errors that can later be uniquely identified, without each developer having to coordinate individual identification elements within their code. Furthermore, other desirable features and characteristics of the present invention will become apparent from the subsequent detailed description of the invention and the appended claims, taken in conjunction with the accompanying drawings and this background of the invention.

Accordingly, in one embodiment, by way of example only, a method for logging and identifying microcode errors in a computing environment is provided. Each of a plurality of errors in the microcode is logged using a plurality of error logging commands. Each of the plurality of errors is indexed to generate a plurality of indexed errors. A plurality of unique keys is associated to each of the plurality of indexed errors. A master index of the plurality of unique keys is created.

In an additional embodiment, a system for logging and identifying microcode errors in a computing environment is provided. An Automated Microcode Detected Error (MDE) Index Generator (AMIG) is operable on the computing environment. The AMIG is adapted for indexing each of a plurality of errors in the microcode to generate a plurality of indexed errors, associating a plurality of unique keys to each of the plurality of indexed errors, and creating a master index of the plurality of unique keys.

In still another embodiment, again by way of example only, a computer program product for logging and identifying microcode errors in a computing environment is provided. The computer program product comprises a computer-readable storage medium having computer-readable program code portions stored therein. The computer-readable program code portions comprise a first executable portion for logging each of a plurality of errors in the microcode using a plurality of error logging commands, a second executable portion for indexing each of the plurality of errors to generate a plurality of indexed errors, a third executable portion for associating a plurality of unique keys to each of the plurality of indexed errors, and a fourth executable portion for creating a master index of the plurality of unique keys.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
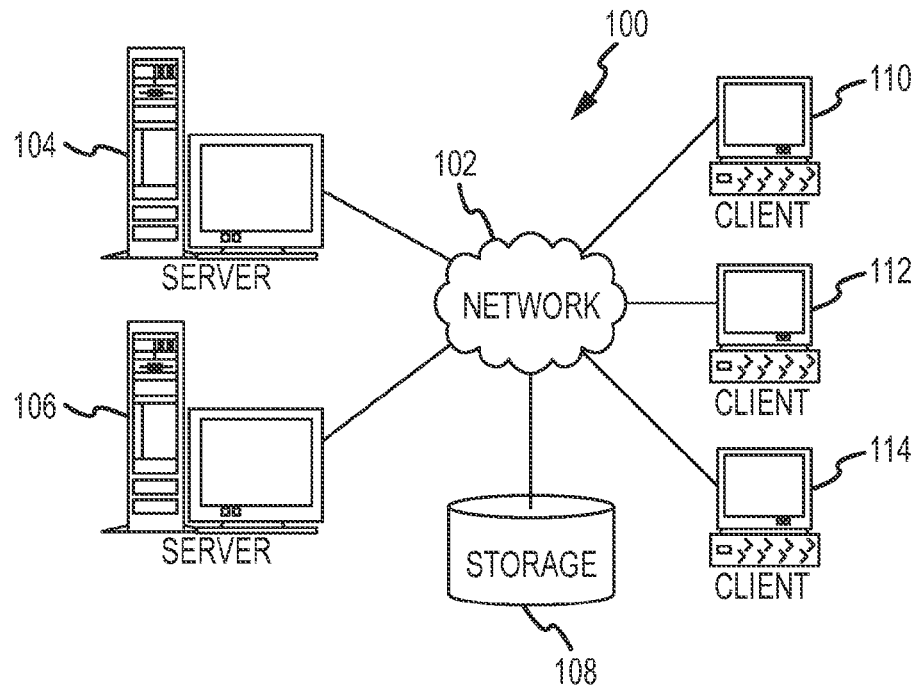
FIG. 1 depicts an exemplary computing environment.
Figure 2:
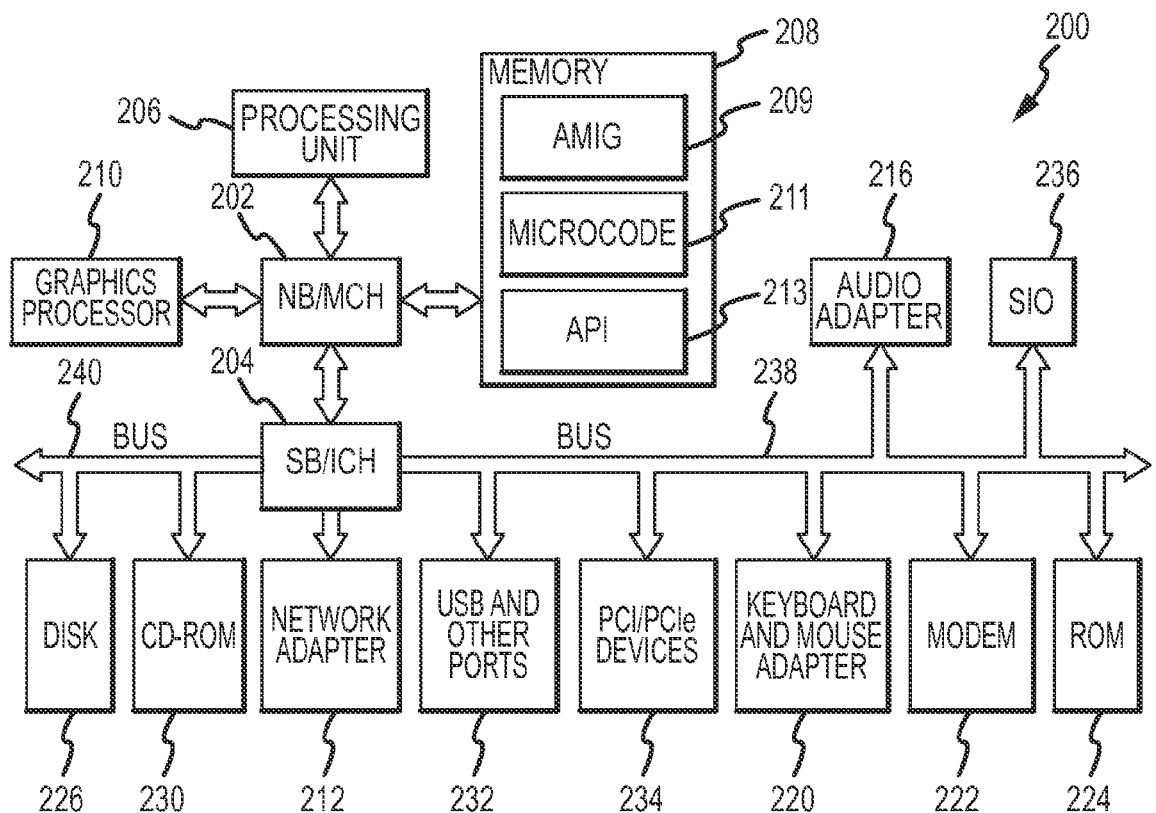
FIG. 2 depicts a portion of the exemplary computing environment shown in FIG. 1.

With reference now to the figures and in particular with reference to FIGS. 1-2, exemplary diagrams of data processing computing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into memory 208 for execution by processing unit 206. The processes of the illustrative embodiments may be performed by processing unit 206 using computer implemented instructions, which may be located in a memory such as, for example, memory 208 (such as microcode 211), read only memory 224, or in one or more peripheral devices.

Memory 208 includes an Automated Microcode Detected Error Index Generator (AMIG) module 209 operational in conjunction with microcode 211. To further illustrate various computer implemented instructions, an Application Programming Interface (API) 213 is also shown in connection with the microcode 211. The functionality of both AMIG 209 and API 213 will be further described, following. As one skilled in the art will anticipate, the microcode 211, AMIG 209, API 213, and other components to further the illustrated embodiments, may be physically or logically placed in various locations and associated with various hardware components of the system 200 and elsewhere.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrated embodiments, incorporating the aforementioned AMIG module, provide a mechanism for developers to ignore the need for unique identifiers when logging errors from their code components, and for service people to have precise component and line number identifiers in MDEs that occur in the field. Once a code level is locked for testing and possible shipment, the AMIG module is adapted to generate a unique index of every point in the code that a developer used the error logging utility, inserting the unique index numbers into the code as it creates index entries. The result is a system that eliminates the need to identify all possible error conditions before code development can begin.

As a developer writes code for his/her code component, they may log errors using specific error logging commands that would contain, at most, a description of the error being logged. These error logging commands may be facilitated in some embodiments by the API 213 (FIG. 2) Once the code is locked, the AMIG module is adapted to crawl the entire body of code, indexing each instance of an error being logged and inserting the index key value into the code. The result provides unique keys for each instance an error is logged, and a master index of keys that contains the components and line numbers within the code corresponding to each error logged. The master key index facilitates the creation of a human-readable error log on a remote machine given only the key values logged on a local machine or local system.

The illustrated embodiments provide a more secure error logging mechanism. Any information intercepted (e.g., between local and remote machine) requires a code key index to be decrypted. In addition, because the byte size of error logs are small (due to keys transmitted between local and remote machine in lieu of errors), a local machine may send all errors of a particular log without the excessive use of computing resources or bandwidth.

Figure 3:
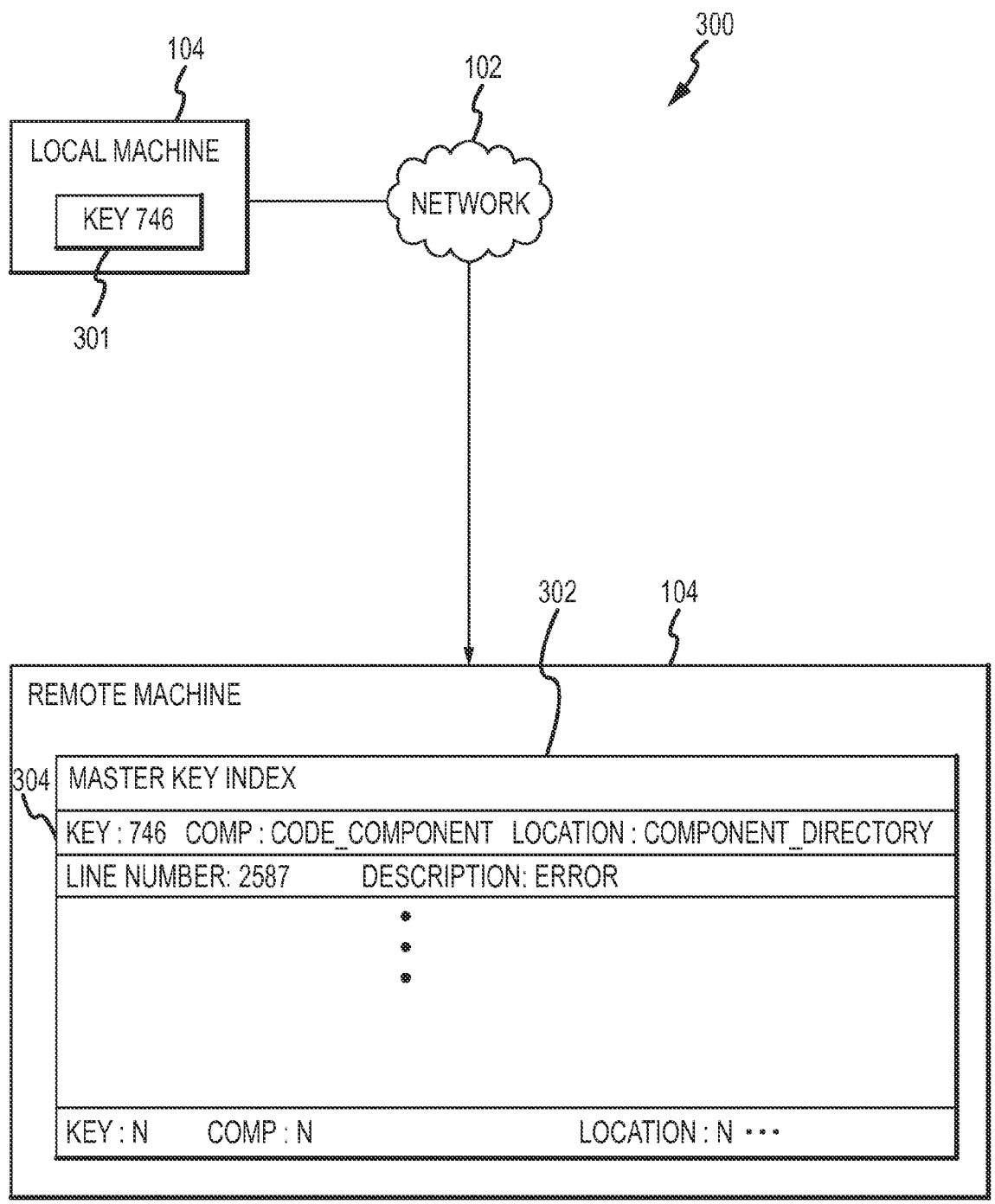
FIG. 3 depicts an exemplary master key index operable on a remote machine.

FIG. 3 illustrates an exemplary computing environment 300 including a master key index operable on a remote machine for use in generating a human-readable error from a unique key sent from a local machine. Local machine 104 sends a unique error key 301 over network 102 to remote machine 104. Remote machine 104 cross references key 301 against a number of keys in the master key index 302 to generate the error information 304. In the illustrated embodiment, error information 304 includes the key information, affected component, location, line number, and an optional description.

As the skilled artisan will appreciate, various functionality associated with the illustrated embodiments may be implemented in various ways. For example, in one embodiment, a first machine (such as a machine 104) may be executing the microcode and hitting the various errors. The first machine may communicate with a second machine (such as a machine 106, or elsewhere). The second machine may contain the aforementioned AMIG module and generate keys 301 which are provided to the first machine. Finally, a third machine (such as remote machine 104 in the illustrated embodiment) may contain the master key index. In this implementation, the third machine may receive a record of error keys from the first machine (generated and provided from the second machine), and generate the error for support personnel. Any number of machines, nodes, modules, and the like may be utilized in various topologies to perform the error logging, indexing, and regeneration functionality.

Figure 4:
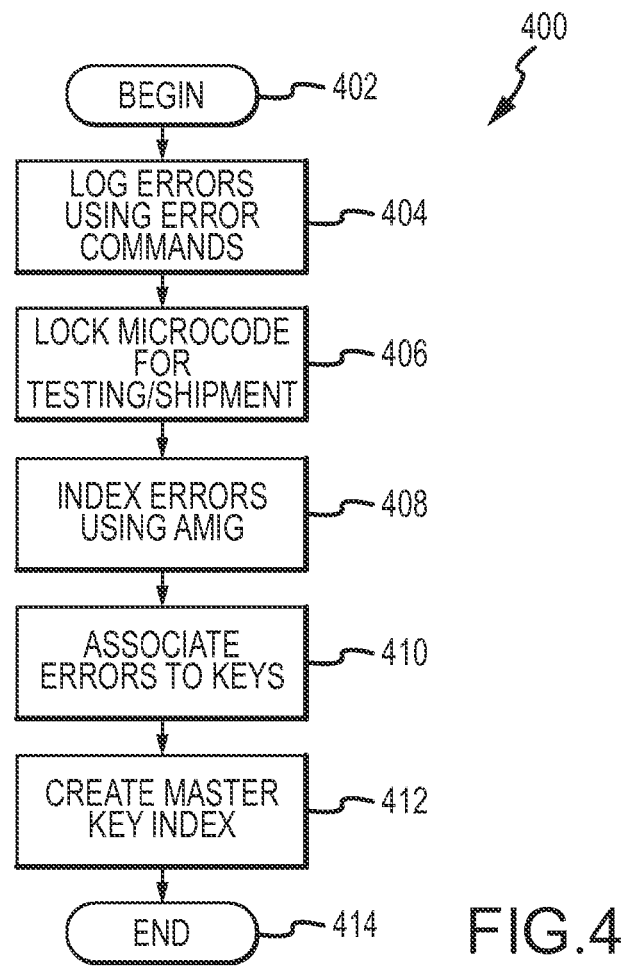
FIG. 4 depicts an exemplary method for logging and indexing errors in a computing environment.
Figure 5:
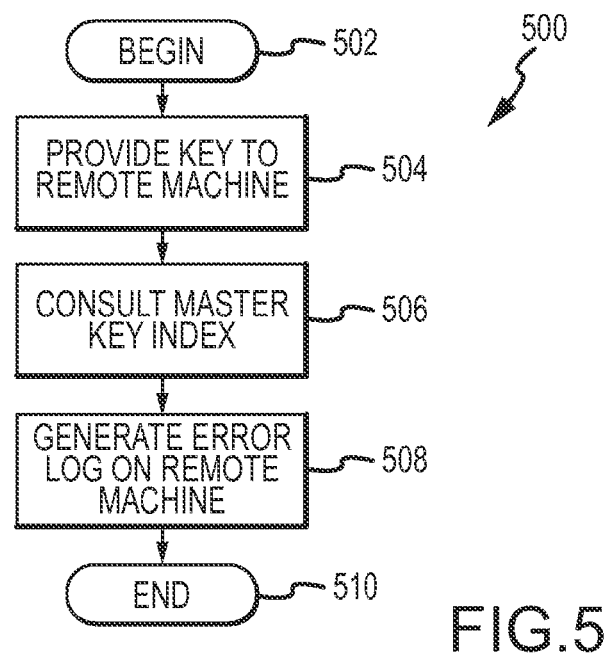
FIG. 5 depicts an exemplary method for generating a human-readable error on a remote machine.

Turning to FIGS. 4 and 5, exemplary methods for logging, indexing and generating microcode errors in a computing environment are shown. As one skilled in the art will appreciate, various steps in the method 200 may be implemented in differing ways to suit a particular application. In addition, the described methods may be implemented by various means, such as hardware, software, firmware, or a combination thereof operational on or otherwise associated with the storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

FIG. 4 illustrates an exemplary method 400 for logging and indexing microcode errors in a computing environment. Method 400 begins (step 402) with the logging of errors using error commands (step 404). In an API example, a developer may write the following error, with an included optional error description: AMIGlogger (% K, 'This is some error description that is optional').

As a next step, the developer locks the microcode for testing/shipment (step 406). The AMIG module indexes each instance of a Microcode Detected Error (MDE) (step 408) by crawling the entire body of microcode. The AMIG module associates each MDE with a unique index key value (key), which is inserted into the code at each error location (step 410). The AMIG module then creates a master key index which registers such attributes as key value, component, line number, location, and description information (step 412). Method 400 then ends (step 414).

FIG. 5 illustrates an exemplary method 500 for generated a human-readable error on a remote machine from a unique key received from a local machine. Method 500 begins (step 502) by the local machine providing the unique key to the remote machine (step 504). The remote machine consults the master key index (step 506) to cross reference the key against the particular error. The remote machine then generates an error log for the unique key (step 508). The method 500 then ends (step 510).

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for logging and identifying microcode errors in a computing environment, comprising:
   logging each of a plurality of errors in the microcode using a plurality of error logging commands;
   indexing each of the plurality of errors to generate a plurality of indexed errors;

associating a plurality of unique keys to each of the plurality of indexed errors; and creating a master key index of the plurality of unique keys.

2. The method of claim 1, wherein indexing each of the plurality of errors to generate a plurality of indexed errors includes executing an Automated Microcode Detected Error (MDE) Index Generator (AMIG) to crawl an entirety of the microcode.

3. The method of claim 1, wherein creating a master index of the plurality of unique keys includes registering one of at least one component and line number within the microcode corresponding to each of the plurality of indexed errors for each of the plurality of unique keys.

4. The method of claim 1, further including, previous to associating a plurality of unique keys to each of the plurality of errors, locking the microcode.

5. The method of claim 1, further including inserting each of the plurality of unique keys into the microcode at each of a plurality of locations where the plurality of errors are logged.

6. The method of claim 1, further including:

receiving a first unique key of the plurality of keys from a remote machine, consulting the master key index to cross reference the first unique key with an associated first indexed error of the plurality of indexed errors, generating a first error of the plurality of errors based on the first indexed error.

7. A system for logging and identifying microcode errors in a computing environment, comprising:

an Automated Microcode Detected Error (MDE) Index Generator (AMIG) operable on the computing environment, wherein the AMIG is adapted for:

indexing each of a plurality of errors in the microcode to generate a plurality of indexed errors, associating a plurality of unique keys to each of the plurality of indexed errors, and creating a master key index of the plurality of unique keys.

8. The system of claim 7, further including an error logging application programming interface (API) in communication with the AMIG, wherein the API is adapted for logging each of a plurality of errors in the microcode using a plurality of error logging commands.

9. The system of claim 7, wherein the AMIG is further adapted to crawl an entirety of the microcode.

10. The system of claim 7, wherein the AMIG is further adapted for registering one of at least one component and line number within the microcode corresponding to each of the plurality of indexed errors for each of the plurality of unique keys.

11. The system of claim 7, wherein the AMIG is further adapted for inserting each of the plurality of unique keys into the microcode at each of a plurality of locations where the plurality of errors are logged.

12. The system of claim 7, further including an error module operational on a local machine in the computing environment, the error module adapted for:

receiving a first unique key of the plurality of keys from a remote machine in the computing environment, consulting the master key index to cross reference the first unique key with an associated first indexed error of the plurality of indexed errors, generating a first error of the plurality of errors based on the first indexed error.

13. A computer program product for logging and identifying microcode errors in a computing environment, the computer program product comprising a computer-readable storage medium having computer-readable program code portions stored therein, the computer-readable program code portions comprising:

a first executable portion for logging each of a plurality of errors in the microcode using a plurality of error logging commands;

a second executable portion for indexing each of the plurality of errors to generate a plurality of indexed errors;

a third executable portion for associating a plurality of unique keys to each of the plurality of indexed errors; and a fourth executable portion for creating a master key index of the plurality of unique keys.

14. The computer program product of claim 13, wherein the second executable portion for indexing each of the plurality of errors to generate a plurality of indexed errors includes a fifth executable portion for executing an Automated Microcode Detected Error (MDE) Index Generator (AMIG) to crawl an entirety of the microcode.

15. The computer program product of claim 13, wherein the fourth executable portion for creating a master index of the plurality of unique keys includes a fifth executable portion for registering one of at least one component and line number within the microcode corresponding to each of the plurality of indexed errors for each of the plurality of unique keys.

16. The computer program product of claim 13, further including a fifth executable portion for, previous to associating a plurality of unique keys to each of the plurality of errors, locking the microcode.

17. The computer program product of claim 13, further including a fifth executable portion for inserting each of the plurality of unique keys into the microcode at each of a plurality of locations where the plurality of errors are logged.

18. The computer program product of claim 13, further including a fifth executable portion for:

receiving a first unique key of the plurality of keys from a remote machine, consulting the master key index to cross reference the first unique key with an associated first indexed error of the plurality of indexed errors, generating a first error of the plurality of errors based on the first indexed error.

* * * * *